United States Patent
Buburuzan et al.

(10) Patent No.: US 11,634,137 B2
(45) Date of Patent: Apr. 25, 2023

(54) APPARATUS, METHOD, COMPUTER PROGRAM, BASE STATION AND VEHICLE FOR PROVIDING INFORMATION RELATED TO AN APPROACHING VEHICLE

(71) Applicant: Volkswagen Aktiengesellschaft, Wolfsburg (DE)

(72) Inventors: Teodor Buburuzan, Braunschweig (DE); Thorsten Hehn, Ingolstadt (DE); Roman Alieiev, Stendal (DE); Ernst Zielinski, Bochum (DE); Joakim Cerwall, Stockholm (SE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 176 days.

(21) Appl. No.: 17/051,295

(22) PCT Filed: May 7, 2019

(86) PCT No.: PCT/EP2019/061661
§ 371 (c)(1),
(2) Date: Oct. 28, 2020

(87) PCT Pub. No.: WO2019/215135
PCT Pub. Date: Nov. 14, 2019

(65) Prior Publication Data
US 2021/0237734 A1 Aug. 5, 2021

(30) Foreign Application Priority Data

May 9, 2018 (EP) ..................................... 18171650

(51) Int. Cl.
*B60W 30/18* (2012.01)
*B60W 30/182* (2020.01)
(Continued)

(52) U.S. Cl.
CPC .... *B60W 30/18109* (2013.01); *B60W 30/182* (2013.01); *G06V 20/56* (2022.01); *G08G 1/22* (2013.01); *B60W 2420/403* (2013.01)

(58) Field of Classification Search
CPC ......... B60W 30/18109; B60W 30/182; B60W 2420/403; G06V 20/56; G08G 1/22
See application file for complete search history.

(56) References Cited

U.S. PATENT DOCUMENTS 5,068,654 A * 11/1991 Husher ................. G08G 1/161
340/10.2
6,218,960 B1 4/2001 Ishikawa et al.
(Continued)

FOREIGN PATENT DOCUMENTS

CN 103043054 A 4/2013
CN 106952483 A 7/2017
(Continued)

*Primary Examiner* — Peter D Nolan
*Assistant Examiner* — Wae L Louie
(74) *Attorney, Agent, or Firm* — 2SPL Patent Attorneys PartG mbB; Kieran O'Leary

(57) ABSTRACT

Embodiments relate to a method, an apparatus, a computer program, a base station and a vehicle for providing information related to an approaching vehicle. The method comprises Receiving (110) information related to a velocity of a plurality of vehicles. The method further comprises Determining (120) the information related to the approaching vehicle based on the information related to the velocity of the plurality of vehicles. The information related to the approaching vehicle indicates a presence of a vehicle of the plurality of vehicles having a velocity higher than an average velocity of the plurality of vehicles. The method further comprises Providing (130) the information related to the approaching vehicle to at least a subset of vehicles of the plurality of vehicles.

10 Claims, 3 Drawing Sheets

(51) Int. Cl.
*G08G 1/00* (2006.01)
*G06V 20/56* (2022.01)

(56) References Cited

U.S. PATENT DOCUMENTS

| | | | | |
|---|---|---|---|---|
| 9,182,764 | B1* | 11/2015 | Kolhouse | G08G 1/017 |
| 9,632,507 | B1* | 4/2017 | Korn | B60W 30/00 |
| 9,679,487 | B1* | 6/2017 | Hayward | G08G 1/0125 |
| 10,332,392 | B2* | 6/2019 | Niu | G08G 1/052 |
| 10,740,850 | B1* | 8/2020 | Slusar | G06Q 40/08 |
| 2013/0041567 | A1* | 2/2013 | Yamashiro | G08G 1/22 |
| | | | | 701/96 |
| 2013/0211624 | A1* | 8/2013 | Lind | G08G 1/22 |
| | | | | 701/2 |
| 2013/0338914 | A1* | 12/2013 | Weiss | G08G 1/0129 |
| | | | | 340/905 |
| 2016/0054735 | A1* | 2/2016 | Switkes | B60W 30/165 |
| | | | | 701/23 |
| 2016/0163200 | A1* | 6/2016 | He | G08G 1/22 |
| | | | | 701/117 |
| 2017/0225682 | A1* | 8/2017 | Schunk | B60L 5/38 |
| 2017/0227972 | A1* | 8/2017 | Sabau | G05D 1/024 |
| 2018/0192270 | A1* | 7/2018 | Schmitz | H04W 72/044 |
| 2018/0283888 | A1* | 10/2018 | Smith | G05D 1/0291 |
| 2018/0319403 | A1* | 11/2018 | Buburuzan | G06V 20/56 |
| 2019/0084566 | A1* | 3/2019 | Park | G05D 1/0287 |
| 2019/0098471 | A1* | 3/2019 | Rech | G08G 1/22 |
| 2019/0308631 | A1* | 10/2019 | Sato | B60W 50/0098 |
| 2019/0318632 | A1* | 10/2019 | Sambale | G05D 1/0027 |
| 2020/0082727 | A1* | 3/2020 | Zhao | G05D 1/0295 |
| 2020/0135032 | A1* | 4/2020 | Switkes | G05D 1/0293 |
| 2020/0153494 | A1* | 5/2020 | Park | H04B 7/0617 |
| 2020/0252769 | A1* | 8/2020 | Alieiev | H04W 4/42 |
| 2020/0389773 | A1* | 12/2020 | Zielinski | H04W 4/46 |
| 2021/0009115 | A1* | 1/2021 | Ohmura | B60T 7/12 |
| 2021/0171038 | A1* | 6/2021 | Lee | H04W 4/023 |
| 2021/0213948 | A1* | 7/2021 | Lahti | G05D 1/0293 |
| 2021/0237734 | A1* | 8/2021 | Buburuzan | G06V 20/56 |

FOREIGN PATENT DOCUMENTS

| | | |
|---|---|---|
| EP | 3188076 A1 | 7/2017 |
| WO | 2008116774 A1 | 10/2008 |
| WO | 2015107732 A1 | 7/2015 |

* cited by examiner

APPARATUS, METHOD, COMPUTER PROGRAM, BASE STATION AND VEHICLE FOR PROVIDING INFORMATION RELATED TO AN APPROACHING VEHICLE

The present invention relates to an apparatus, a method, a computer program, a base station and a vehicle for providing information related to an approaching vehicle, more precisely, but not exclusively, to detecting an approaching vehicle driving with an higher than average velocity based on information related to a velocity of a plurality of vehicles.

The development of warning mechanisms for vehicles with the intention of warning a conductor of the vehicle of approaching vehicles is a field of research and development. Today, when drivers leave their current lane (e.g. to overtake another vehicle) and move to another (target) lane, assistance systems monitor the sides of the vehicles and, in such lane-changing situations can warn the driver if another vehicle is already present on the target lane. This is both helpful in situations where the other vehicle is close to the own vehicle and traveling with a similar speed as the own vehicle (blind spot), but also when the other vehicle is coming from behind with a relative high speed (outside the view of the driver and barely perceivable in the rear-mirror). Such assistance systems may be based on having radar sensors monitoring the sides of the vehicle, from the rear-mirrors and going up to a limited range behind own vehicle. They may be used for detecting other vehicles within their detection range, providing the driver with this information, and eventually providing a warning if the driver tries to change the lane where these vehicles are being detected.

European patent application EP 3 188 076 A1 discloses an onboard vehicle notification system, in which a vehicle notifies a driver of a potentially dangerous vehicle. In EP 3 188 076 A1, the vehicle captures an image of its surroundings, identifies other vehicles surrounding the vehicle, and looks up the vehicles using a database, the database comprising information on anomalous behavior of said vehicles.

US patent application US 2013/0338914 A1 discloses a driving assessment system that automatically assesses driving conditions around a driver to identify safety hazards and to subsequently inform that driver when an unusually hazardous condition exists.

U.S. Pat. No. 9,679,487 B1 discloses a system, in which geographic location data and telematics data is collected in real-time. The telematics data indicates vehicle direction, speed, motion, etc., as well as traffic hazards in the surrounding environment. A remote server receives the location and telematics data from two vehicles. If an anomalous or hazardous condition exists in the vicinity of the first vehicle, an alert or alternate route is transmitted to a second vehicle.

There may be a desire for an improved concept for warning users of approaching vehicles.

Embodiments are based on the finding that approaching vehicles are hard to detect based on local sensor information of a single vehicle. By combining the sensor information of a plurality of vehicles, speeding vehicles may be detected, and the combined information may be distributed to a plurality of vehicles driving in a vicinity of the speeding vehicles to provide an advance warning to the other vehicles.

Embodiments provide a method for providing information related to an approaching vehicle. The method comprises receiving information related to a velocity of a plurality of vehicles. The method further comprises determining the information related to the approaching vehicle based on the information related to the velocity of the plurality of vehicles. The information related to the approaching vehicle indicates a presence of a vehicle of the plurality of vehicles having a velocity higher than an average velocity of the plurality of vehicles. The method further comprises providing the information related to the approaching vehicle to at least a subset of vehicles of the plurality of vehicles. Combining the velocity information of a plurality of vehicles, detecting a vehicle travelling at an increased velocity and passing that information on to a plurality of other vehicles may enable providing an advance warning to other vehicles, enabling them to be cautious when changing lanes.

In various embodiments, the information related to the approaching vehicle is provided to the subset of vehicles of the plurality of vehicles using a wireless communication channel. For example, the information related to the approaching vehicle may be provided to the subset of vehicles of the plurality of vehicles by a stationary relay station, e.g. a roadside station. Alternatively, the information related to the approaching vehicle may be provided to the subset of vehicles of the plurality of vehicles by a base station of a cellular mobile communication system. Stationary stations, such as a stationary relay station or a base station, may be used to monitor the traffic and to provide advance warning to vehicles if a vehicle travelling as an increased velocity is detected within a coverage area of the stationary relay station or base station.

Alternatively, the information related to the approaching vehicle may be provided to the subset of vehicles of the plurality of vehicles by a vehicle, e.g. the vehicle performing the method. For example, the vehicle providing the information related to the approaching vehicle may be the vehicle of the plurality of vehicles having a velocity higher than the average velocity of the plurality of vehicles, and may warn vehicles ahead of it of its approach. For example, the method may further comprise determining the velocity of the vehicle (e.g. of the vehicle performing the method). The information related to the approaching vehicle may be provided, if the velocity of the vehicle is higher than the average velocity of the plurality of vehicles. In this embodiment, the approaching vehicle is the vehicle performing the method. Alternatively, the vehicle providing the information related to the approaching vehicle may be a different vehicle (e.g. not the vehicle of the plurality of vehicles having a velocity higher than the average velocity of the plurality of vehicles). For example, the information related to the approaching vehicle may be provided to at least the subset of vehicles of the plurality of vehicles if the velocity of the vehicle of the plurality of vehicles having a velocity higher than an average velocity of the plurality of vehicles is higher by at least a pre-defined margin than a velocity of a vehicle performing the method.

In at least some embodiments, the information related to the approaching vehicle is provided to at least the subset of vehicles of the plurality of vehicles if the velocity of the vehicle of the plurality of vehicles having a velocity higher than an average velocity of the plurality of vehicles is higher by at least a pre-defined margin than the average velocity of the plurality of vehicles. A warning may be provided if the velocity differential may cause the approaching vehicle to be undetected by the vehicles in front. Additionally, the information related to the approaching vehicle may be provided to at least the subset of vehicles of the plurality of vehicles if the average velocity of the plurality of vehicles is below a velocity threshold. If the approaching vehicle approaches a road section with stop-and-go traffic, a warning may be provided to the slower vehicles and/or to the approaching vehicle.

In some embodiments, the information related to the approaching vehicle is provided to at least the subset of vehicles of the plurality of vehicles if the velocity of the vehicle of the plurality of vehicles having a velocity higher than an average velocity of the plurality of vehicles is higher by at least a pre-defined margin than a recommended or mandated speed limit of a road driven on by the plurality of vehicles. This may provide advance warning of a speeding vehicle to the subset of vehicles, which might not expect a vehicle travelling at such speeds.

In various embodiments, the plurality of vehicles comprises a first subset of vehicles having a first lower mandated speed limit (e.g. trucks or lorries) and a second subset of vehicles having a second higher mandated or recommended speed limit (e.g. cars). The information related to the approaching vehicle may be provided to at least the subset of vehicles of the plurality of vehicles if the velocity of the vehicle of the plurality of vehicles having a velocity higher than an average velocity of the plurality of vehicles is higher by at least a pre-defined margin than an average velocity of the second subset of vehicles. Using the average velocity of cars, which may travel at higher speeds, as basis for comparison may avoid having inherently slower vehicles skew the basis of comparison.

In some embodiments, the method further comprises obtaining sensor information of a distance sensor module of a vehicle performing the method. The determining of the information related to the approaching vehicle may be further based on the sensor information. Incorporating velocity information of vehicles located using local sensor information may enable detecting vehicles, which do not broadcast their velocity.

In some embodiments, the subset of vehicles forms a platoon of vehicles. Vehicles of the platoon of vehicles may warn each other of approaching vehicles having an increased velocity.

Embodiments further provide a computer program having a program code for performing the method, when the computer program is executed on a computer, a processor, or a programmable hardware component.

Embodiments further provide an apparatus for providing information related to an approaching vehicle. The apparatus comprises at least one communication module for receiving information related to a velocity of a plurality of vehicles and for providing the information related to the approaching vehicle to at least a subset of vehicles of the plurality of vehicles. The apparatus further comprises a control module configured to obtain the information related to the velocity of the plurality of vehicles via the at least one communication module. The control module is further configured to determine the information related to the approaching vehicle based on the information related to the velocity of the plurality of vehicles. The information related to the approaching vehicle indicates a presence of a vehicle of the plurality of vehicles having a velocity higher than an average velocity of the plurality of vehicles. The control module is further configured to provide the information related to the approaching vehicle to at least a subset of vehicles of the plurality of vehicles via the at least one communication module.

Embodiments further provide a vehicle comprising the apparatus

Embodiments further provide a base station of a cellular mobile communication system, the base station comprising the apparatus.

Some other features or aspects will be described using the following non-limiting embodiments of apparatuses or methods or computer programs or computer program products by way of example only, and with reference to the accompanying figures, in which.

Figure 1A:
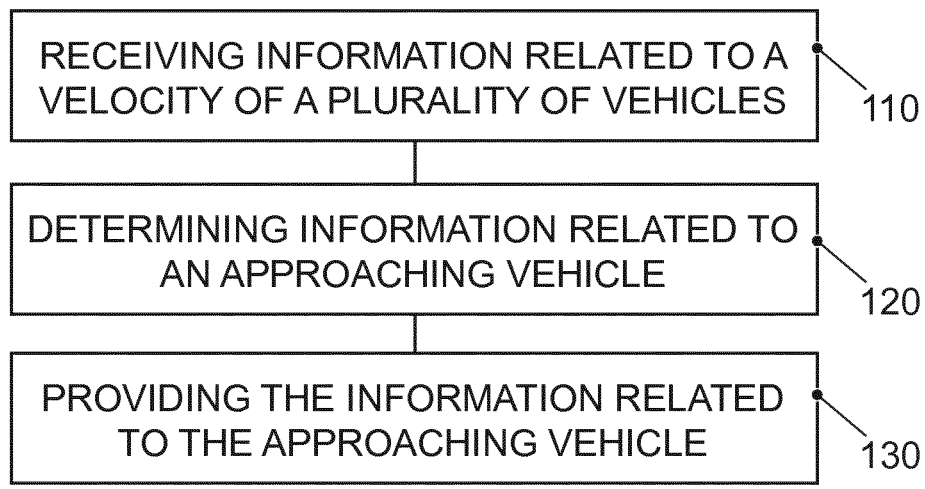
FIGS. 1a and 1b show a flow chart of embodiments of a method for providing information related to an approaching vehicle.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Warning systems, e.g. Volkswagen SideAssist, are often based on having radar sensors monitoring the sides of the vehicle, from the rear-mirrors and going up to a limited range behind own vehicle. They may be used for detecting other vehicles within their detection range, and offering the driver this information, and eventually providing a warning if the driver tries to change the lane where these vehicles are being detected. So most of the situations in a "blind spot" scenario may be covered by radar sensors.

Such a system may have limitations if other vehicles are approaching from behind with higher speed. The range of the sensors monitoring the sides of own vehicle may be limited and might detect a vehicle approaching with high speed when it is close to the own vehicle.

In addition to the radar sensors, to warn against vehicles approaching at high speeds, connectivity may be used for detecting approaching vehicles which are outside the range of the radar sensors. V2X (Vehicle-to-X)-technologies like IEEE 802.11p (a standard of the Institute of Electrical and Electronics Engineers) or Cellular-V2X may be used for continually and periodically disseminating the position and the speed of the vehicles (which may be received as information related to a velocity of a plurality of vehicles). This information may be available in a range of up to one kilometer. Receiving vehicles within this range may use the position and speed information to enhance the information coming from the side distance sensors, like radar, and inform the driver of the vehicles approaching from behind at high speeds. At least some embodiments may provide a connected assistance system based on vehicle-side radar sensors and V2X messages, wherein the assistance system is connected to other systems.

The information received via V2X messages or technologies may be used in two ways:

As an addition for performing plausibility checks on the data received from the radar sensors of the assistance systems. This may enable the assistance system sensors, like radar, to provide information that is more reliable over longer ranges, since the V2X-Information may be used to perform plausibility checks on the detected radar objects, which without the V2X information might not have been considered. This may enable the Connected-assistance systems to provide more reliable information and over longer ranges.

Beyond the enhanced ranges of the assistance system, the V2X technology may be used (alone) to increase the awareness of the driver that a vehicle travelling at higher speeds is around it. So the connected assistance system may rely on the V2X-information alone. Not just V2X communication technologies might be used for the connected assistance system, but also cellular-based technologies like 4G and 5G in combination with Mobile-Edge-Cloud (e.g. for receiving information related to a velocity of a plurality of vehicles and for providing information related to an approaching vehicle as introduced in connection with FIGS. 1a-4). A Mobile-Edge-Cloud (e.g. a stationary relay station of a base station as introduced in the following) may monitor the vehicles traveling with higher speed (e.g. 20 km/h more than the average of all vehicles within a predefined area) within a predefined geographic area (e.g. the coverage area of the stationary relay station or of the base station) and inform the other vehicles about their position (e.g. by providing information related to an approaching vehicle as introduced in the following). They might then compare this position with their own position and if the high speed vehicles are within e.g. 1-kilometer rage, the assistance system function may warn or inform the driver in a similar may as it might do with the on-board sensors (e.g. radar). This may basically tell the driver to increase its awareness when changing lanes because there is a high probability that a vehicle traveling with a relative higher speed is around it.

Figure 1B:
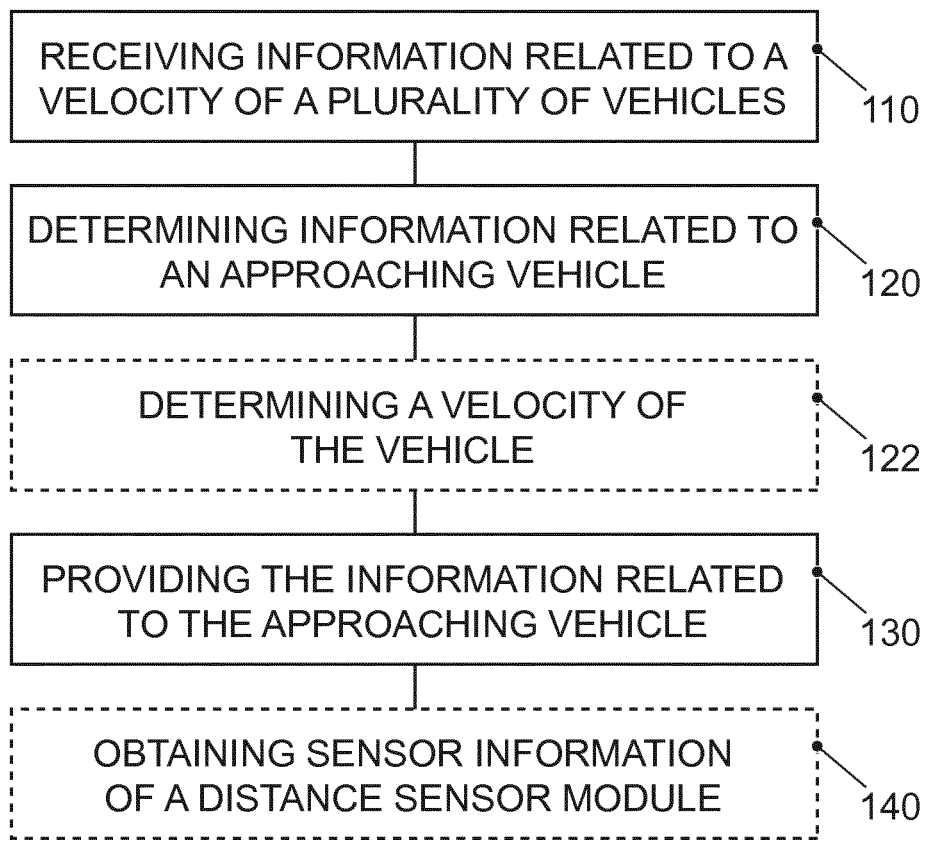

FIGS. 1a and 1b show a flow chart of embodiments of a method for providing information related to an approaching vehicle. The method comprises receiving 110 information related to a velocity of a plurality of vehicles. The method further comprises determining 120 the information related to the approaching vehicle based on the information related to the velocity of the plurality of vehicles. The information related to the approaching vehicle indicates a presence of a vehicle of the plurality of vehicles having a velocity higher than an average velocity of the plurality of vehicles. The method further comprises providing 130 the information related to the approaching vehicle to at least a subset of vehicles of the plurality of vehicles.

Figure 2A:
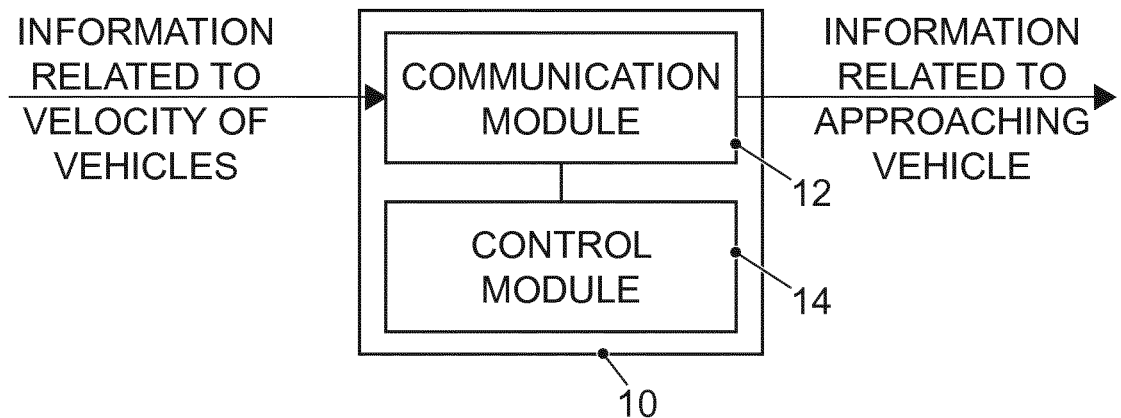
FIGS. 2a and 2b show block diagram of embodiments of an apparatus for providing information related to an approaching vehicle.
Figure 2B:
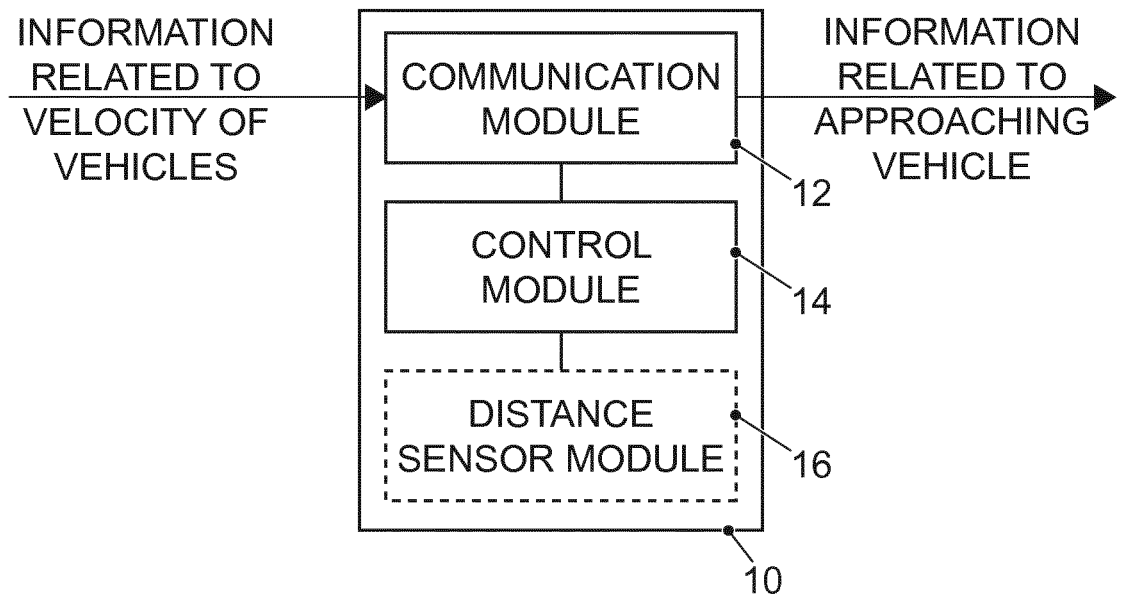

FIGS. 2a and 2b show block diagram of embodiments of a corresponding apparatus 10 for providing information related to an approaching vehicle. The apparatus 10 comprises at least one communication module 12 for receiving the information related to the velocity of the plurality of vehicles and for providing the information related to the approaching vehicle to at least a subset of vehicles of the plurality of vehicles. The apparatus 10 further comprises a control module 14 configured to obtain the information related to the velocity of the plurality of vehicles via the at least one communication module 12. The control module 14 is further configured to determine the information related to the approaching vehicle based on the information related to the velocity of the plurality of vehicles. The control module 14 is further configured to provide the information related to the approaching vehicle to at least a subset of vehicles of the plurality of vehicles via the at least one communication module 12.

Figure 3:
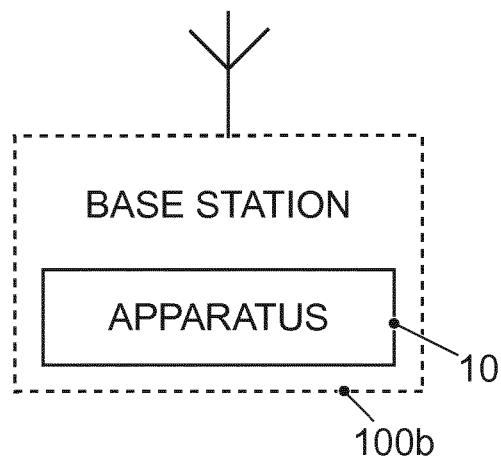
FIG. 3 shows a block diagram of a base station comprising an apparatus for providing information related to an approaching vehicle.
Figure 4:
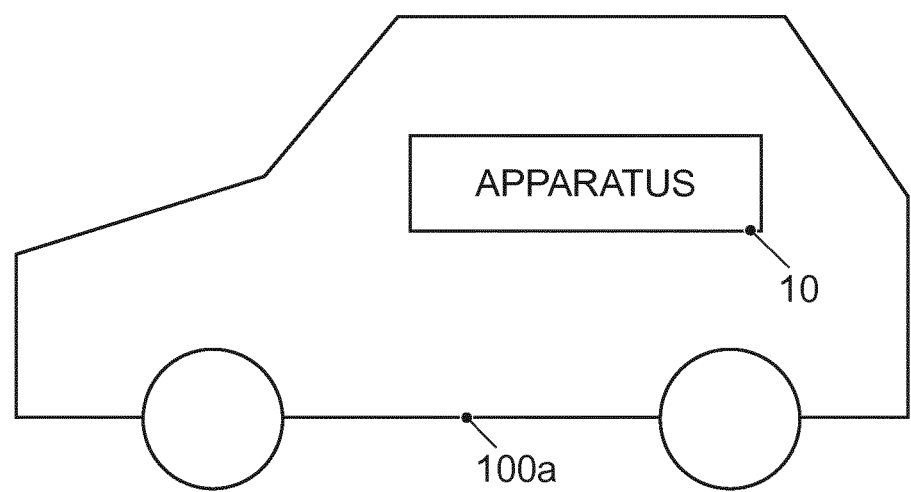
FIG. 4 shows a block diagram of a vehicle comprising an apparatus for providing information related to an approaching vehicle.

FIG. 3 shows a block diagram of a base station 100b comprising the apparatus 10 for providing information related to the approaching vehicle. FIG. 4 shows a block diagram of a vehicle 100a comprising the apparatus 10 for providing the information related to the approaching vehicle.

The following description relates to the method of FIGS. 1a and 1b, the apparatus of FIG. 2, the base station of FIG. 3 and the vehicle of FIG. 4.

In at least some embodiments, the method may be suitable for warning vehicles (e.g. the plurality of vehicles or the subset of vehicles) of a vehicle approaching at a velocity higher than the average velocity of other vehicles, e.g. vehicles which may surprise and therefore endanger vehicles that are planning to change a lane. Therefore, the information related to the approaching vehicle may correspond to an advance warning of the approaching vehicle, e.g. to caution the plurality of vehicles/the subset of vehicles against the approaching vehicle. In at least some embodiments, a vehicle receiving the information related to the approaching vehicle may be configured to display or show a warning, e.g. a warning light or a sound if a user of the vehicle attempts or plans to change lanes. In embodiments, the subset of vehicles (or the entire plurality of vehicles) may be vehicles travelling in the same direction (and/or on the same road) as the approaching vehicle. The approaching vehicle may approach at least the subset of vehicles from behind, e.g. the approaching vehicle may be about to overtake the one or more vehicles of the subset of vehicles (or of the plurality of vehicles). The information related to the approaching vehicle may indicate to the vehicles of the subset of vehicles about to be overtaken by the approaching vehicle that the approaching vehicle is approaching them at an increased velocity, e.g. a higher than average velocity or, in some embodiments, a velocity higher than that of vehicles of the subset of vehicles. In some embodiments, the information related to the approaching vehicle may be provided (only) to vehicles having a lower velocity than the approaching vehicle.

In various embodiments, the information related to the approaching vehicle may indicate, that a vehicle is approaching that is faster than most or all other vehicles of the plurality of vehicles, e.g. faster than the vehicles of the subset of vehicles. For example, the information related to the approaching vehicle may indicate, that a vehicle is approaching (e.g. nearing the subset of vehicles from behind) that is faster than the average velocity of the plurality of vehicles, e.g. faster by a pre-defined margin. The information related to the approaching vehicle may indicate to the subset of vehicles to use caution when changing lanes. For example, the presence of the vehicle of the plurality of vehicles having a velocity higher than the average velocity of the plurality of vehicles may correspond to the vehicle of the plurality of vehicles having a velocity higher than the average velocity of the plurality of vehicles driving on the same road as the plurality of vehicles and in the same direction, and may indicate that the vehicle of the plurality of vehicles having a velocity higher than the average velocity of the plurality of vehicles is nearing the subset of vehicles from behind. In at least some embodiments, the information related to the approaching vehicle may comprise location information and/or velocity information of the approaching vehicle, e.g. of the vehicle of the plurality of vehicles having a velocity higher than an average velocity of the plurality of vehicles. The approaching vehicle may be the vehicle of the plurality of vehicles having a velocity higher than the average velocity of the plurality of vehicles.

In various embodiments, the receiving 110 of the information related to the velocity of the plurality of vehicles may comprise or correspond to receiving 110 the information related to the velocity of the plurality of vehicles individually from each vehicle. Alternatively, the receiving 110 of the information related to the velocity of the plurality of vehicles may comprise receiving at least a subset of the information related to the velocity of the plurality of vehicles in combined form, e.g. via relay vehicle or a stationary relay station. The information related to the velocity of the plurality of vehicles may comprise information related to individual velocities of the plurality of vehicles, e.g. for each vehicle of the plurality of vehicles. Alternatively or additionally, the information related to the velocity of the plurality of vehicles may comprise information related to an average velocity of a subset of vehicles of the plurality of vehicles. For example, the information related to the velocity of the plurality of vehicles may comprise information related to a position and information related to a velocity for each vehicle of the plurality of vehicles. For example, the receiving 110 of the information related to the velocity of the plurality of vehicles may comprise or correspond to wirelessly receiving the information related to the velocity of the plurality of vehicles or wirelessly receiving at least a subset of the information related to the velocity of the plurality of vehicles, e.g. via a (direct) vehicular communication standard, or via a cellular mobile communication system. For example, the vehicular communication standard may be based on IEEE (Institute of Electrical or Electronics Engineers) 802.11p. The information related to the velocity of the plurality of vehicles may be (at least partially) received 110 via one or more Car-to-Car (C2C), Car-to-X (C2X). Vehicle-to-Vehicle (V2V) or Vehicle-to-X (V2X) messages. In various embodiments, the information related to the velocity of the plurality of vehicles may be (at least partially) received 110 via direct vehicle-to-vehicle or direct vehicle-to-road side station (e.g. stationary relay station) messages. Alternatively, the information related to the velocity of the plurality of vehicles may be (at least partially) received 110 via a stationary relay station or via a base station of a cellular mobile communication system. For example, the plurality of vehicles may comprise vehicles within an area, e.g. an area around a vehicle, stationary relay station or base station performing the method. The plurality of vehicles may comprise vehicles travelling on the same road or in the same direction on the same road.

Additionally, if the method is performed by a vehicle, the receiving 110 may further comprise partially receiving the information related to the velocity of the plurality of vehicles from the vehicle, e.g. from a velocity sensor or positioning sensor of the vehicle.

In various embodiments, the method further comprises filtering the information related to the velocity of the plurality of vehicles to exclude velocity information of a further subset of vehicles of the plurality of vehicles. For example, the information related to the approaching vehicle may be determined 120 for a specific road and/or a specific driving direction. The filtering of the information related to the velocity of the plurality of vehicles may filter out velocity information of vehicles travelling on a different road and/or in a different direction. Additionally or alternatively, the information related to the approaching vehicle may be determined 120 for an area. The filtering of the information related to the velocity of the plurality of vehicles may filter out velocity information of vehicles outside the area, e.g. more than a pre-defined threshold outside the area.

In embodiments, the determining 120 of the information related to the approaching vehicle may comprise detecting a vehicle among the plurality of vehicles driving at a velocity that is substantially higher (e.g. higher by at least a pre-defined margin) than the velocity of other vehicles of the plurality of vehicles. For example, the determining 120 of the information related to the approaching vehicle may comprise detecting a vehicle among the plurality of vehicles driving at a velocity that may endanger the subset of vehicles while changing lanes. In at least some embodiments, the determining 120 of the information related to the approaching vehicle may comprise detecting the presence of the vehicle of the plurality of vehicles having a velocity higher than an average velocity of the plurality of vehicles, e.g. by comparing the velocity of the vehicle of the plurality of vehicles having a velocity higher than an average velocity of the plurality of vehicles to a recommended speed limit or to a mandated speed limit of a road being traversed by the vehicle of the plurality of vehicles having a velocity higher than an average velocity of the plurality of vehicles, by comparing the velocity of the vehicle of the plurality of vehicles having a velocity higher than an average velocity of the plurality of vehicles to the average velocity of the plurality of vehicles, by comparing the velocity of the vehicle of the plurality of vehicles having a velocity higher than an average velocity of the plurality of vehicles to an average velocity of a further subset (e.g. to a second subset as defined in the following) of the plurality of vehicles, and/or by comparing the velocity of the vehicle of the plurality of vehicles having a velocity higher than an average velocity of the plurality of vehicles to the velocity of a vehicle performing the method. The determining 120 may comprise determining the average velocity of the plurality of vehicles or determining the average velocity of the further subset of vehicles of the plurality of vehicles. The determining 120 of the information related to the approaching vehicle may be further based on a pre-defined margin. The pre-defined margin may be a threshold, above which a difference between the velocity of the approaching vehicle and the average velocity of at least the further subset (or the entire) plurality of vehicles is considered to be dangerous or noteworthy, e.g. may lead to dangerous situations when vehicles of the plurality of vehicles are attempting to change lanes. For example, the pre-defined margin may be at least 10 km/h (or at least 15 km/h, at least 20 km/h, at least 25 km/h).

In various embodiments, the information related to the approaching vehicle is provided 130 to at least the subset of vehicles of the plurality of vehicles if the velocity of the vehicle of the plurality of vehicles having a velocity higher than an average velocity of the plurality of vehicles is higher by at least the pre-defined margin than the average velocity of the plurality of vehicles. For example, only a subset of vehicles of the plurality of vehicles might be considered when determining the average velocity. In some embodiments, the plurality of vehicles comprises a first subset of vehicles having a first lower mandated speed limit and a second subset of vehicles having a second higher mandated or recommended speed limit. For example, the first subset of vehicles may comprise trucks or lorries, vehicles having a weight or size above a threshold, which may be used to carry goods. The second subset of vehicles may comprise cars, e.g. vehicles having a weight or size below the threshold. The information related to the approaching vehicle may be provided 130 to at least the subset of vehicles of the plurality of vehicles if the velocity of the vehicle of the plurality of vehicles having a velocity higher than an average velocity of the plurality of vehicles is higher by at least a pre-defined margin than an average velocity of the second subset of vehicles.

In at least some embodiments, the information related to the approaching vehicle may be (only) provided 130 to at least the subset of vehicles of the plurality of vehicles if the velocity of the vehicle of the plurality of vehicles having a velocity higher than an average velocity of the plurality of vehicles is higher by at least a pre-defined margin (e.g. the pre-defined margin or a further pre-defined margin) than a recommended or mandated speed limit of a road driven on by the plurality of vehicles. For example, the information related to the approaching vehicle might be only provided if the approaching vehicle is speeding, e.g. exceeding recommended or mandated speed limits.

In some embodiments, the method may be performed or executed by a vehicle, e.g. the vehicle 100*a* of FIG. 4. The information related to the approaching vehicle may be provided 130 to at least the subset of vehicles of the plurality of vehicles if the velocity of the vehicle of the plurality of vehicles having a velocity higher than an average velocity of the plurality of vehicles is higher by at least a pre-defined margin than a velocity of the vehicle (100*a*) performing the method, e.g. to warn vehicles in front of the approaching vehicles. In some embodiments, as further shown in FIG. 1*b*, the method further comprises determining 122 the velocity of the vehicle. For example, the apparatus 10 may comprise a velocity sensor (e.g. a speedometer) and/or a positioning sensor, and the control module 14 may be configured to determine the velocity of the vehicle based on the velocity sensor or based on the positioning sensor. The information related to the approaching vehicle might (only) be provided, if the velocity of the vehicle is higher than the average velocity of the plurality of vehicles. For example, the information related to the approaching vehicle may be provided 130 to at least the subset of vehicles of the plurality of vehicles if the velocity of the vehicle of the plurality of vehicles having a velocity higher than an average velocity of the plurality of vehicles is higher by at least a pre-defined margin than a velocity of the vehicle (100*a*) performing the method and if the vehicle performing the method is not substantially slower than the recommended speed limit or the mandated speed limit, e.g. less than 10 km/h slower than the recommended speed limit or the mandated speed limit, or if the vehicle performing the method is not substantially slower than the average velocity of the vehicles of the group of vehicles (e.g. less than 10 km/h slower).

In some embodiments, the information related to the approaching vehicle is provided 130 to at least the subset of vehicles of the plurality of vehicles if the average velocity of the plurality of vehicles is below a velocity threshold, e.g. below 60 km/h (or below 50 km/h, below 40 km/h, below 30 km/h). For example, the information related to the approaching vehicle may be provided 130 to at least the subset of vehicles of the plurality of vehicles if the average velocity of the plurality of vehicles indicates a traffic jam or stop-and-go traffic.

In various embodiments, the information related to the approaching vehicle may be provided 130 (e.g. transmitted) using a wireless communication channel, e.g. using the vehicular communication standard or using a cellular mobile communication system. The information related to the approaching vehicle may be provided 130 via one or more Car-to-Car (C2C), Car-to-X (C2X). Vehicle-to-Vehicle (V2V) or Vehicle-to-X (V2X) messages. In various embodiments, information related to the approaching vehicle may be provided 130 via direct vehicle-to-vehicle or direct vehicle-to-road side station (e.g. stationary relay station) messages. Alternatively, information related to the approaching vehicle may be provided 130 via a stationary relay station or via a base station of a cellular mobile communication system. In various embodiments, the providing 130 of the information related to the approaching vehicle may comprise broadcasting the information related to the approaching vehicle. The broadcast may be limited, e.g. to vehicles travelling on the same road as the approaching vehicle or to vehicles travelling within a pre-defined distance of the approaching vehicle or of the entity (e.g. the apparatus 10) performing the method. The information related to the approaching vehicle may comprise information related to a broadcast limit, e.g. information related to an area the information related to the approaching vehicle is valid for or information related to a subset of vehicles the information related to the approaching vehicle is relevant for.

In some embodiments, the information related to the approaching vehicle may be provided 130 to the subset of vehicles of the plurality of vehicles by a stationary relay station or by a base station of a cellular mobile communication system. For example, the stationary relay station or the base station may be configured to perform or execute the method (e.g. as shown in FIGS. 3 and 4). The stationary relay station or the base station may be configured to receive 110 (e.g. collect, gather, compile or accumulate) the information related to the velocity of the plurality of vehicles within a coverage area of the stationary relay station/of the base station. The stationary relay station or the base station to the subset of vehicles of the plurality of vehicles within the coverage area of the stationary relay station or of the base station. The coverage area of the stationary relay station or the base station may comprise at least the subset of vehicles of the plurality of vehicles (or the entire plurality of vehicles).

A base station can be located in the fixed or stationary part of the network or system. A base station may correspond to a remote radio head, a transmission point, an access point, radio equipment, a macro cell, a small cell, a micro cell, a femto cell, a metro cell etc. A base station may correspond to a base station understood as a logical concept of a node/entity terminating a radio bearer or connectivity over the air interface between a terminal/mobile transceiver and a radio access network. A base station can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station may correspond to a NodeB, an eNodeB, a Base Transceiver Station (BTS), an access point, a remote radio head, a transmission point, a relay transceiver etc., which may be further subdivided in a remote unit and a central unit. A mobile transceiver (e.g. a vehicle) can be associated, camped on, or registered with a base station transceiver or cell. The base station may be configured to receive the information related to the velocity of the plurality of vehicles and to provide the information related to the approaching vehicle over the cellular mobile communication system.

For example, a stationary relay station may a road side station of a vehicular communication network. For example, the stationary relay station may be suitable for receiving wireless messages from vehicles (e.g. the information related to the approaching vehicle and/or the information related to the velocity of the plurality of vehicles) and for transmitting wireless messages to vehicles using a vehicular communication standard/vehicular communication protocol. For example, the stationary relay station may be (permanently or semi-permanently) arranged at the side of a road, e.g. at the side of the road the approaching vehicle is travelling on. The stationary relay station may be configured to receive the information related to the velocity of the plurality of vehicles via direct vehicular communication (e.g. V2X or C2X) messages, and to provide the information related to the approaching vehicle via at least one direct vehicular communication (V2X or C2X) message, e.g. without involving a base station.

Alternatively, the information related to the approaching vehicle may be provided 130 to the subset of vehicles of the plurality of vehicles by a vehicle, e.g. by the vehicle 100a of FIG. 4. For example, the vehicle (100a) may be a land vehicle, a road vehicle, a car, an automobile, an off-road vehicle, a motor vehicle, a truck or a lorry.

In various embodiments, the subset of vehicles of the plurality of vehicles (subset of vehicles of the plurality of vehicles) may comprise the entire plurality of vehicles. Alternatively, the subset of vehicles of the plurality of vehicles may comprise vehicles within a coverage area of an entity (e.g. the vehicle, the stationary relay station or the base station) performing the method. Alternatively, the subset of vehicles of the plurality of vehicles may be chosen based on a relevance of the information related to the approaching vehicles to the plurality of vehicles. For example, the information related to the approaching vehicle might (only) be provided 130 to vehicles of the plurality of vehicles driving in front of the approaching vehicle. Alternatively or additionally, the information related to the approaching vehicle might (only) be provided 130 to vehicles of the plurality of vehicles having a lower velocity than the approaching vehicle (or having a velocity less than the average velocity of the plurality of vehicles, or having a velocity less than the pre-defined margin higher than the average velocity of the plurality of vehicles). In some embodiments, the subset of vehicles may form a platoon of vehicles. The method may be performed by a vehicle of the platoon of vehicles, or by a stationary relay station or base station configured for or suitable for monitoring or controlling the platoon of vehicles. Grouping vehicles into platoons is method of increasing the capacity of roads. Within a platoon, a group of vehicles may be coordinated to accelerate or break simultaneously, allowing for smaller distances between the vehicles.

In some embodiments, as further shown in FIG. 1b, the method further comprises obtaining 140 (distance) sensor information of a distance sensor module of a vehicle performing the method. For example, as further shown in FIG. 2b, the apparatus may further comprise the distance sensor module. The distance sensor module may e.g. be one of an ultrasound sensor module, a time of flight sensor module, a RADAR (Radio Detection and Ranging) sensor module or a LIDAR (Light Detection and Ranging) sensor module. The distance sensor module may be configured to provide the (distance) sensor information. For example, the (distance) sensor information may comprise information related to a distance of vehicles of the plurality of vehicles from the vehicle performing the method (e.g. from the vehicle 100a of FIG. 4). For example, the determining 120 of the information related to the approaching vehicle may be further based on the sensor information. For example, the sensor information may be comprised in the information related to the velocity of the plurality of vehicles received 110. For example, the method may further comprise determining a velocity and/or a position of vehicles of the plurality of vehicles based on the (distance) sensor information for the information related to the velocity of the plurality of vehicles. In embodiments, the information related to the velocity of the plurality of vehicles may comprise local sensor data and velocity information received via a wireless communication channel. In some embodiments, the control module 14 may be configured to provide a warning to the user based on the information related to the approaching vehicle, e.g. a sound warning or a visual warning. The method may further comprise providing the warning to the user of the vehicle based on the information related to the approaching vehicle.

The at least one communication module 12 may be or comprise a wireless communication module. The at least communication module 12 may be implemented as any means for (wirelessly) transceiving, i.e. receiving and/or transmitting etc., one or more (wireless) communication units, one or more wireless communication devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (ND), one or more Digital-to-Analog converters (D/A), one or more modulators or demodulators, one or more mixers, one or more antennas, etc. In at least some embodiments, the at least one communication module 12 is configured to communicate via a vehicular communication network, e.g. via a Car-to-Car (C2C), Car-to-X (C2X). Vehicle-to-Vehicle (V2V) or Vehicle-to-X (V2X) communication network. The at least one communication module 12 may be configured to communicate directly with other vehicles, e.g. the plurality of vehicles or the subset of vehicles, i.e. without involving any base station transceiver, which, if the method is performed by a vehicle or a stationary relay station, is also referred to as Device-to-Device (D2D) communication. In some embodiments, the communication may be aided by a base station transceiver. In order to do so radio resources are used, e.g. frequency, time, code, and/or spatial resources, which may as well be used for wireless communication with a base station transceiver. The assignment of the radio resources may be controlled by the base station transceiver, i.e. the determination which resources are used for D2D and which are not, or the assignment of the radio resource is determined by the (vehicular) communication protocol, e.g. if the resources are not shared with a cellular communication network. In some embodiments, a base station transceiver may comprise the apparatus, e.g. the base station transceiver may perform the method. The at least one communication module 12 may be configured to communication via a cellular mobile communication system, In general, the cellular mobile communication system may, for example, correspond to one of the Third Generation Partnership Project (3GPP)-standardized mobile communication networks, where the term mobile communication system is used synonymously to mobile communication network. The cellular mobile communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc. For example, the at least one communication module 12 may be configured to receive the information related to the velocity of the plurality of vehicles via the cellular mobile communication system and to provide the information related to the approaching vehicle to at least a subset of vehicles of the plurality of vehicles via the cellular mobile communication system. The base station 100b may be base station of the cellular mobile communication system.

The control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

As already mentioned, in embodiments the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS

10 Apparatus
12 Communication module
14 Control module
16 Distance sensor module
100a Vehicle
100b Base station
110 Receiving information related to a velocity of a plurality of vehicles
120 Determining information related to an approaching vehicle
122 Determining the velocity of the vehicle
130 Providing the information related to the approaching vehicle
140 Obtaining sensor information of a distance sensor module

The invention claimed is:

1. A method for providing information related to an approaching vehicle, the method comprising:
receiving information related to a velocity of a plurality of vehicles;
determining the information related to the approaching vehicle based on the information related to the velocity of the plurality of vehicles, wherein the information related to the approaching vehicle indicates a presence of a vehicle of the plurality of vehicles having a velocity higher than an average velocity of the plurality of vehicles, wherein the approaching vehicle is the vehicle of the plurality of vehicles having a velocity higher than the average velocity of the plurality of vehicles; and
providing the information related to the approaching vehicle to at least a subset of vehicles of the plurality of vehicles, wherein the information related to the approaching vehicle is provided to the subset of vehicles of the plurality of vehicles by a stationary relay station or by a base station of a cellular mobile communication system.

2. The method according to claim 1, wherein the information related to the approaching vehicle is provided to the subset of vehicles of the plurality of vehicles using a wireless communication channel.

3. The method according to claim 1, wherein the information related to the approaching vehicle is provided to at least the subset of vehicles of the plurality of vehicles if the velocity of the vehicle of the plurality of vehicles having a velocity higher than an average velocity of the plurality of vehicles is higher by at least a pre-defined margin than the average velocity of the plurality of vehicles.

4. The method according to claim 1, wherein the information related to the approaching vehicle is provided to at least the subset of vehicles of the plurality of vehicles if the average velocity of the plurality of vehicles is below a velocity threshold.

5. The method according to claim 1, wherein the information related to the approaching vehicle is provided to at least the subset of vehicles of the plurality of vehicles if the velocity of the vehicle of the plurality of vehicles having a velocity higher than an average velocity of the plurality of vehicles is higher by at least a pre-defined margin than a recommended or mandated speed limit of a road driven on by the plurality of vehicles.

6. The method according to claim 1,
wherein the plurality of vehicles comprises a first subset of vehicles having a first lower mandated speed limit and a second subset of vehicles having a second higher mandated or recommended speed limit,
wherein the information related to the approaching vehicle is provided to at least the subset of vehicles of the plurality of vehicles if the velocity of the vehicle of the plurality of vehicles having a velocity higher than an average velocity of the plurality of vehicles is higher by at least a pre-defined margin than an average velocity of the second subset of vehicles.

7. The method according to claim 1, further comprising obtaining sensor information of a distance sensor module of a vehicle performing the method, wherein the determining of the information related to the approaching vehicle is further based on the sensor information.

8. The method according to claim 1, wherein the subset of vehicles forms a platoon of vehicles.

9. A non-transitory, computer-readable medium having a program code for performing the method according to claim 1, when the program code is executed on a computer, a processor, or a programmable hardware component.

10. A base station of a cellular mobile communication system comprising an apparatus for providing information related to an approaching vehicle, the apparatus comprising:
at least one communication module for receiving information related to a velocity of a plurality of vehicles;
a control module, configured to:
obtain the information related to the velocity of the plurality of vehicles via the at least one communication module,
determine the information related to the approaching vehicle based on the information related to the velocity of the plurality of vehicles,
wherein the information related to the approaching vehicle indicates a presence of a vehicle of the plurality of vehicles having a velocity higher than an average velocity of the plurality of vehicles,
wherein the approaching vehicle is the vehicle of the plurality of vehicles having a velocity higher than the average velocity of the plurality of vehicles, and to
provide the information related to the approaching vehicle to at least a subset of vehicles of the plurality of vehicles via the at least one communication module.

* * * * *